(12) United States Patent
Lee

(10) Patent No.: US 9,600,293 B2
(45) Date of Patent: Mar. 21, 2017

(54) LOGIC BLOCK ADDRESSING (LBA) CONFIGURATION METHOD AND NON-VOLATILE MEMORY DEVICE HAVING THE SAME

(71) Applicant: APACER TECHNOLOGY INC., New Taipei (TW)

(72) Inventor: Jiunn-Chang Lee, New Taipei (TW)

(73) Assignee: Apacer Technology Inc., New Taipei (TW)

( * ) Notice: Subject to any disclaimer, the term of this patent is extended or adjusted under 35 U.S.C. 154(b) by 127 days.

(21) Appl. No.: 14/503,604

(22) Filed: Oct. 1, 2014

(65) Prior Publication Data
US 2016/0011968 A1 Jan. 14, 2016

(30) Foreign Application Priority Data
Jul. 9, 2014 (TW) .............................. 103123657 A

(51) Int. Cl.
*G06F 12/00* (2006.01)
*G06F 9/44* (2006.01)
*G06F 12/02* (2006.01)
*G06F 12/10* (2016.01)

(52) U.S. Cl.
CPC ............ *G06F 9/4408* (2013.01); *G06F 9/441* (2013.01); *G06F 9/4406* (2013.01); *G06F 12/0246* (2013.01); *G06F 12/1009* (2013.01); *G06F 2212/7201* (2013.01)

(58) Field of Classification Search
CPC ....... G06F 9/4408; G06F 9/441; G06F 9/4406
See application file for complete search history.

(56) References Cited

U.S. PATENT DOCUMENTS 8,161,142 B2* 4/2012 Bashir ................ G06F 11/1417
709/220

* cited by examiner

*Primary Examiner* — Hal Schnee
*Assistant Examiner* — Alan Otto
(74) *Attorney, Agent, or Firm* — Rosenberg, Klein & Lee

(57) ABSTRACT

A logic block addressing (LBA) configuration method and a non-volatile memory device having the same are provided. The non-volatile memory device determines one of logic zones configured in an LBA table according to the number of booting times. The selected logic zone corresponds to a data zone configured in a physical volume. The non-volatile memory device accesses data stored in the data zone in the selected logic zone. Accordingly, in each boot, the instant disclosure provides the LBA configuration method and the non-volatile memory device having the same, which can show data stored in the different data zones of the physical volume to simplify user operation and avoid the user maliciously destroying or erroneously deleting other data stored in the unused data zones of the physical volume, thereby enhancing the efficiency of the non-volatile memory device executing the multi-booting.

9 Claims, 4 Drawing Sheets

LOGIC BLOCK ADDRESSING (LBA) CONFIGURATION METHOD AND NON-VOLATILE MEMORY DEVICE HAVING THE SAME

BACKGROUND

1. Technical Field

The present invention relates to a LBA configuration method and a non-volatile memory device having the same, in particular, to a LBA configuration method and a non-volatile memory device having the same for executing specific data of a physical volume configured in the non-volatile memory device based on a number of times for booting the non-volatile memory device.

2. Description of Related Art

The conventional storage device programs multi-boot sectors by software and selects the corresponding LBA by the external input device, i.e., enters the operation system (OS) of the selected LBA by the operation of keyboard input, mouse click, or etc. For example, the first OS and the second OS is respectively stored in the storage device by user and there are two LBAs in the sector corresponding to the first OS and the second OS. When the user wants to boot the first OS, the user can operate the keyboard input or the mouse click to select the corresponding LBA, so as to enter and execute the first OS.

In the structure, the user can see each of the LBAs. Therefore, when the user operates the keyboard input or mouse click, the user may maliciously destroy or mistakenly delete other unused LBAs. Besides, it is not convenient that the user has to operate the keyboard input or the mouse click to enter the OS to be executed. Not only can this simplify user operations and avoid the user maliciously destroying or mistakenly deleting other unused LBAs, it can also enhance the efficiency of the storage device executing the multi-booting.

SUMMARY

Accordingly, the exemplary embodiments of the instant disclosure provide a logic block addressing (LBA) configuration method. The LBA configuration method is adapted for a non-volatile memory device. The non-volatile memory device has an LBA table corresponding to a physical volume and the LBA table has a plurality of logic zones. The LBA configuration method is as follows: receiving a start signal and counting a number of times for receiving the start signal. Then selecting one of the logic zones according to the number of times and a total amount of the logic zones. Then executing an access of data in the selected logic zone, wherein the selected logic zone corresponds to a data zone of the physical volume and the data is stored in the data zone.

The exemplary embodiments of the instant disclosure also provide a non-volatile memory device. The non-volatile memory device includes a storage memory, a transmission interface, and a controller. The storage memory is configured for storing a physical volume. The controller is coupled between the storage memory and the transmission interface. The controller is configured for having an LBA table corresponding to the physical volume, and the LBA table configured for having a plurality of logic zones. The controller receives a start signal and counts a number of times for receiving the start signal for selecting one of the logic zones according to the number of times and a total amount of the logic zones. The controller executes an access of data in the selected logic zone. The selected logic zone corresponds to a data zone of the physical volume and the data is stored in the data zone.

To sum up, the exemplary embodiments of the instant disclosure provide an LBA configuration method and a non-volatile memory device having the same, which determines one of logic zones configured in an LBA table according to the number of times receiving a start signal (i.e., the non-volatile memory generates one start signal in each booting). The selected logic zone corresponds to a data zone configured in a physical volume. The non-volatile memory device accesses data stored in the data zone in the selected logic zone. Accordingly, in each boot, the instant disclosure provides the LBA configuration method and the non-volatile memory device having the same, which can show data stored in the different data zones of the physical volume to simplify user operations and avoid the user maliciously destroying or mistakenly deleting data stored in the unused data zones of the physical volume, thereby enhancing the efficiency of the non-volatile memory device executing the multi-booting.

In order to further understand the techniques, means and effects of the present invention, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present invention.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain the principles of the present invention.

DESCRIPTION OF THE EXEMPLARY EMBODIMENTS

Figure 1:
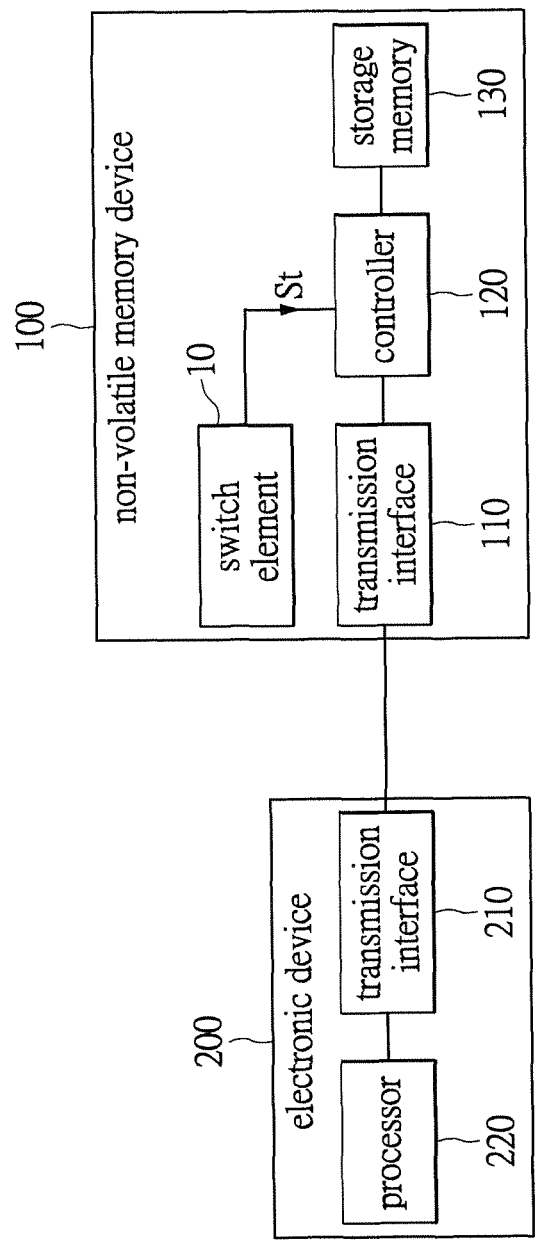
FIG. 1 is a block diagram of an electronic device and a non-volatile memory device according to an exemplary embodiment of the instant disclosure.

Reference will now be made in detail to the exemplary embodiments of the present disclosure, examples of which are illustrated in the accompanying drawings. However, they may be embodied in different forms and should not be construed as limited to the embodiments set forth herein. Wherever possible, the same reference numbers are used in the drawings and the description to refer to the same or like parts.

Firstly, please refer to FIG. 1, which shows a block diagram of an electronic device and a non-volatile memory device according to an exemplary embodiment of the instant disclosure. As shown in FIG. 1, the non-volatile memory device 100 includes a transmission interface 110, a controller 120, and a storage memory 130. In the instant disclosure, the non-volatile memory device 100 may be a flash memory IC, a read-only memory IC, or a dram IC, and the instant disclosure is not limited thereto.

The controller is configured for receiving a start signal St to execute the further determination based on the start signal St. In the instant disclosure, the start signal St is generated by a switch element 10 and the switch element 10 is electrically connected to the controller 120. Therefore, when the user presses the switch element 10, the switch element 10 may generate the start signal St to the controller 120, so that the controller 120 may execute the further determination based on the start signal St.

The non-volatile memory device 100 of the instant embodiment can further connect to an electronic device 200. The electronic device can be, for example, a desktop computer, a laptop computer, a tablet computer, or a smart phone. The instant disclosure is not limited thereto. The electronic device 200 includes a transmission interface 210 and a processor 220. The transmission interface 210 is electrically connected to the processor 220. The processor 220 is the main computing center of the electronic device 200, in practice, the processor 220 may be a process IC, such as a CPU, a micro controller or an embedded controller. The transmission interface 210 may be a SATA interface, a USB interface, or an IDE interface in practice. The instant disclosure is not limited thereto.

In the instant embodiment, the transmission interface 110 of the non-volatile memory device 100 is the same as the transmission interface 210 of the electronic device 200, so that the non-volatile memory device 100 and the electronic device 200 may transmit data by the transmission interface 110 and the transmission interface 210. This means that if the transmission interface 210 is a SATA interface, the transmission interface 110 is also the SATA interface.

The non-volatile memory device 100 can be configured inside or outside the electronic device 200 to provide the electronic device 200 accessing the data, for example, the hard disk configured inside the computer or the external hard disk. The instant disclosure is not limited thereto.

The storage memory 130 is configured for storing a physical volume. The physical volume is divided into a plurality of data zones and the data zones store different data respectively. The controller 120 is electrically connected between the transmission interface 110 and the storage memory 130. Please refer to FIG. 2 in conjunction with FIG. 1. The controller 120 of the non-volatile memory device 100 has an LBA table 122. The LBA table 122 has a plurality of logic zones and the LBA table 122 corresponds to the physical volume 132.

In the instant disclosure, the LBA table 122 may be configured to have logic zones and the logic zones may have the same capacity, such as two or four same logic zones. The LBA table 122 may also be configured for having logic zones and the logic zones may have the different capacity. The instant disclosure is not limited thereto. Each of the logic zones is composed of a plurality of sectors. Each of the logic zones corresponds one-on-one to the data zones of the physical volume 132.

Figure 2:
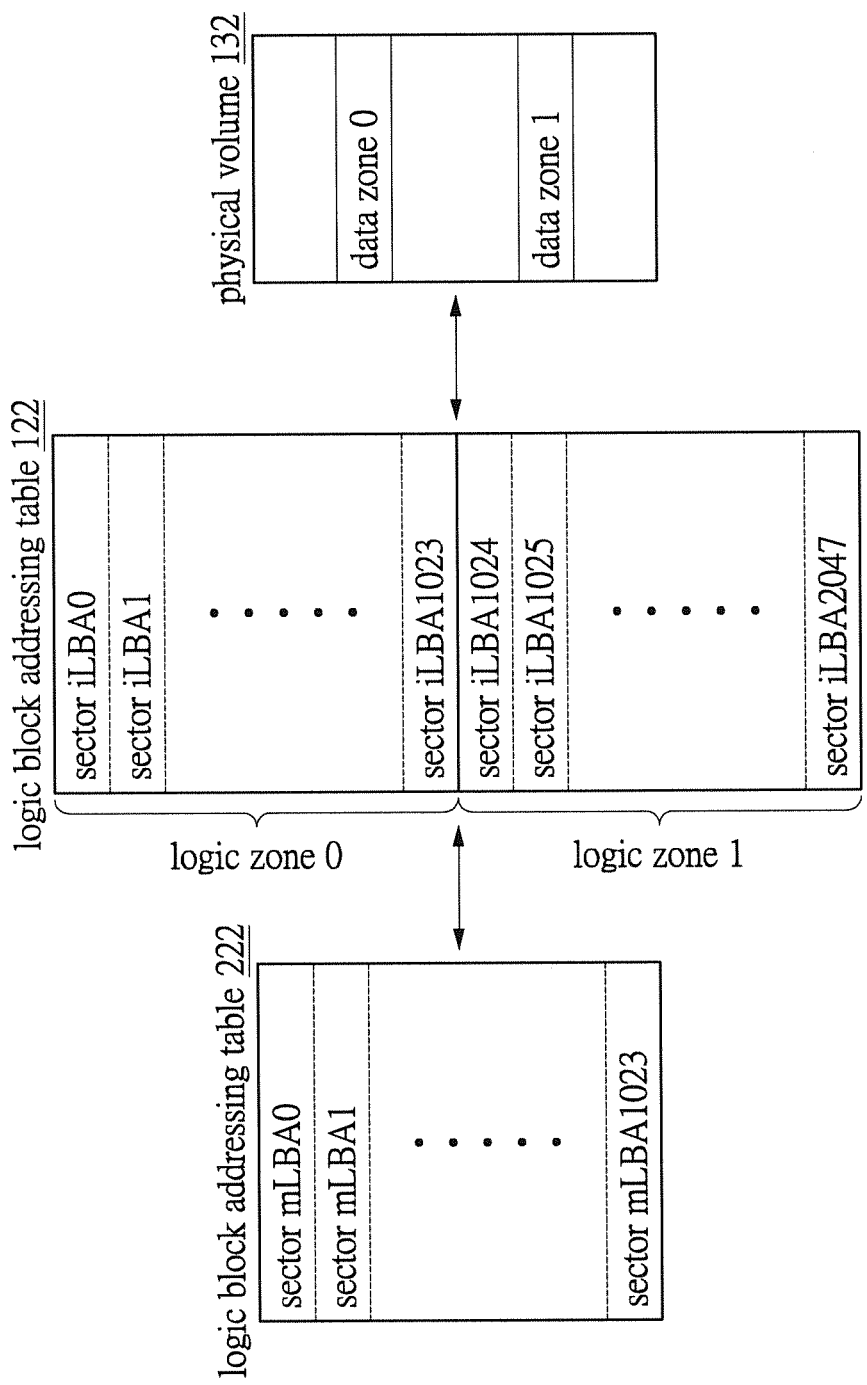
FIG. 2 is a block diagram of LBAs and a physical volume of the non-volatile memory device according to an exemplary embodiment of the instant disclosure.

The following description further elaborates the relationship between the LBA table 122 and the physical volume 132. As shown in FIG. 2, the LBA table 122 has 2048 sectors, i.e., sectors iLBA0~iLBA2047. The LBA table 122 has two logic zones having the same capacity, i.e., logic zone 0 and logic zone 1. The logic zone 0 is composed of the sectors iLBA0~iLBA1023 and corresponds to the data zone 0 of the physical volume 132. The logic zone 1 is composed of the sectors iLBA1024~iLBA2047 and corresponds to the data zone 1 of the physical volume 132. Accordingly, the logic zone 0 and the logic zone 1 of the LBA table 122 respectively correspond to the data zone 0 and the data zone 1 of the physical volume 132.

After the controller 120 receives the start signal St (e.g., the switch element 10 generates and transmits the start signal St to the controller 120), the controller 120 counts a number of times for receiving the start signal St and selects one of the logic zones according to the number of times for receiving the start signal St and a total amount of the logic zone. Then the controller 120 accesses data in the selected logic zone. More specifically, the number of times for receiving the start signal St may correspond to one logic zone. Therefore, the controller 120 may select the corresponding logic zone according to the number of times for receiving the start signal St. With an increase of the number of times for receiving the start signal St, the number of times may correspond in sequence to the specific logic zone. For example, there are three logic zones. When the number of times for receiving the start signal is one, the controller 120 selects the first logic zone. When the number of times for receiving the start signal is two, the controller 120 selects the second logic zone. When the number of times for receiving the start signal is three, the controller 120 selects the third logic zone. The said number of times may irregularly correspond to the specific logic zone. The instant disclosure is not limited thereto.

In the instant disclosure, the controller 120 includes a selection function for selecting one of the logic zones. The selection function is shown as follows.

$$vLM = \mathrm{MOD}(vPOC/\mathrm{Zone})$$

vLM represents an ordinal of the selected logic zone, vPOC represents the number of times for receiving the start signal, and Zone represents the total amount of the logic zones in the LBA table. One of the logic zones can be generated by another method and the instant disclosure is not limited thereto.

The relationship between the LBA table 122 and the physical volume 132 of FIG. 2 is still taken as the example. The total amount of the logic zones is two, i.e., Zone=2. Therefore, when the number of times for the controller 120 receiving the start signal St is three, i.e., vPOC=3, vLM is one, i.e., vLM=MOD(vPOC/Zone)=MOD(3/2)=1. At present, the controller 120 selects the logic zone 1 based on the result of vLM. Then the controller 120 accesses data stored in the data zone 1 of the physical volume 132 in the logic zone 1.

The controller 120 also transmits the sectors representing the selected logic zone to the electronic device 200 by the transmission interface 110 and the transmission interface 210, so that the electronic device 200 executes the data stored in the corresponding data zone of the physical volume 132 by the selected logic zone. As shown in FIG. 2, the processor 220 of the electronic device 200 has LBA table 222 and the LBA table 222 is composed of sectors mLBA0~mLBA1023. The controller 120 may correspondingly transmit the sectors iLBA1024~iLBA2047 of the logic zone 1 to the sectors mLBA0~mLBA1023 of the LBA table 222 by the transmission interface 110 and the transmission interface 210, to notify the processor 220 to access the data in the data zone 1 of the physical volume 132. Then the processor 220 may access the data stored in the data zone 1 of the physical volume 132 accordingly.

When the user presses the switch element 10 once again, the non-volatile memory device 100 is restarted (i.e., rebooted), the controller 120 receives the start signal St once again. At present, the controller 120 counts the number of times of receiving the start signal St is four, i.e., vPOC=4. The total amount of the logic zones is also two, i.e., Zone=2. Thus, vLM is zero, i.e., 11/14=MOD(vPOC/Zone)=MOD (4/2)=0. At present, the controller 120 selects the logic zone 0 based on the result of vLM (i.e., vLM=0). Then the controller 120 accesses data stored in the data zone 0 of the physical volume 132 in the logic zone 0.

Next, the controller 120 also correspondingly transmit the sectors iLBA0~iLBA1023 of the logic zone 0 to the sectors mLBA0~mLBA1023 of the LBA table 222 by the transmission interface 110 and the transmission interface 210, to notify the processor 220 to access the data in the data zone 0 of the physical volume 132. Then the processor 220 may access the data stored in the data zone 0 of the physical volume 132 accordingly.

It is worth to note that the controller 120 of the non-volatile memory device 100 determines the logic zone of the LBA table 122 (e.g., the logic zone 0) and the corresponding data zone of the physical volume 132 (e.g., the data zone 0 corresponding to the logic zone 0) by the number of times for booting (i.e., receiving the start signal St). The controller 120 transmits the corresponding sectors of the determined logic zone (e.g., the sectors iLBA0~iLBA1023 of the logic zone 0) to the sectors mLBA0~mLBA1023 of the LBA table 222 of the processor 220, to notify the processor 220 executing the data in the corresponding data zone (e.g., the data zone 0).

Therefore, in the structure of the non-volatile memory device 100, the user cannot see each logic zone of the LBA table 122 simultaneously, i.e., the user cannot see the logic zone 0 and logic zone 1 in the electronic device 200 simultaneously. Accordingly, it avoids the user maliciously destroying or mistakenly deleting data stored in the unused data zones of the physical volume. Besides, the non-volatile memory device 100 determines the logic zone of the LBA table 122 and the corresponding data zone of the physical volume 132 by the number of times for booting. Therefore, in each booting, the non-volatile memory device 100 may show data stored in the different data zones of the physical volume. Accordingly, it can simplify user operations and enhance the efficiency of the non-volatile memory device 100 executing the multi-booting.

Figure 3:
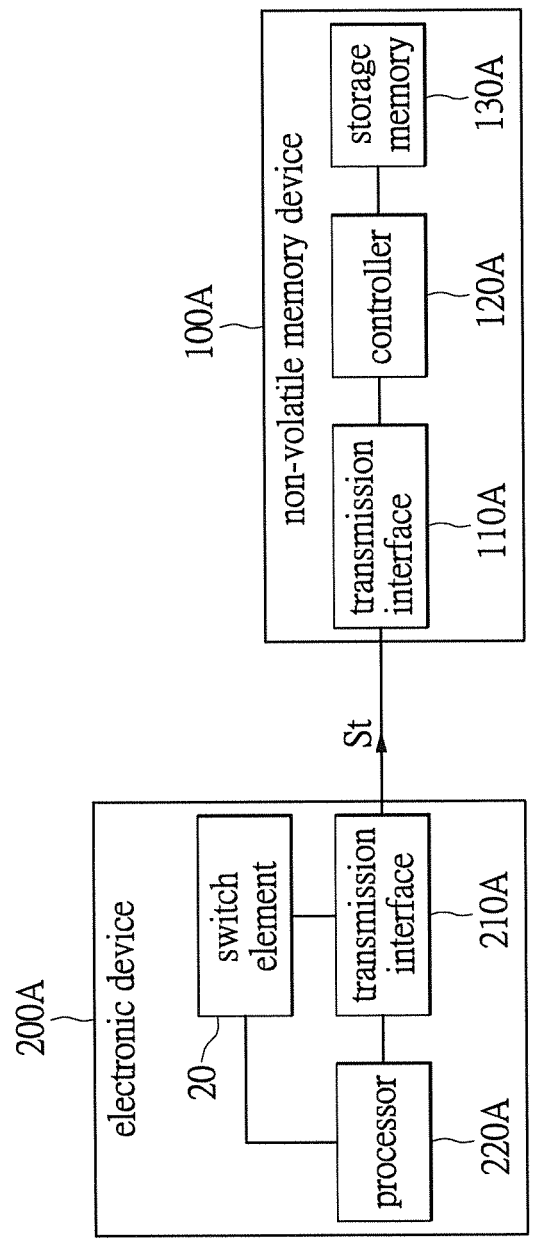
FIG. 3 is a block diagram of an electronic device and a non-volatile memory device according to another exemplary embodiment of the instant disclosure.

In addition, it is worth to note that the start signal may also be generated by the electronic device, i.e., the switch element 10 of FIG. 1 is configured to the electronic device. Please refer to FIG. 3, which shows a block diagram of an electronic device and a non-volatile memory device according to another exemplary embodiment of the instant disclosure. The difference between FIG. 1 and FIG. 3 is that the electronic device 200A shown in FIG. 3 has a switch element 20, instead of the switch element 10 shown in FIG. 1. The switch element 20 is electrically connected to the processor 220A and the transmission interface 210A and the start signal St is generated by the switch element 20. The switch element 20, in practice, may be a booting button configured in the electronic device 200A to notify the processor 220A starting the electronic device 200A (i.e., executing the booting procedure). Then the processor 220A transmits the start signal St to the controller 120A by the transmission interface 210A and the transmission interface 110A to execute the further procedure.

Therefore, when the user presses the switch element 20, the processor 220A starts the electronic device 200A (i.e., booting the electronic device 200A) and then transmits the start signal St to the transmission interface 110A by the transmission interface 210A, so that the controller 120A accordingly executes the further determination. The connection relationships and operations among the transmission interface 110A, the controller 120A, and the storage memory 130A of the non-volatile memory device 100A, and the transmission interface 210A and the processor 220A of the electronic device 200A in FIG. 3 are approximately the same as those among the transmission interface 110, the controller 120, and the storage memory 130 of the non-volatile memory device 100, and the transmission interface 210 and the processor 220 of the electronic device 200 in FIG. 1, and further descriptions are hereby omitted.

Figure 4:
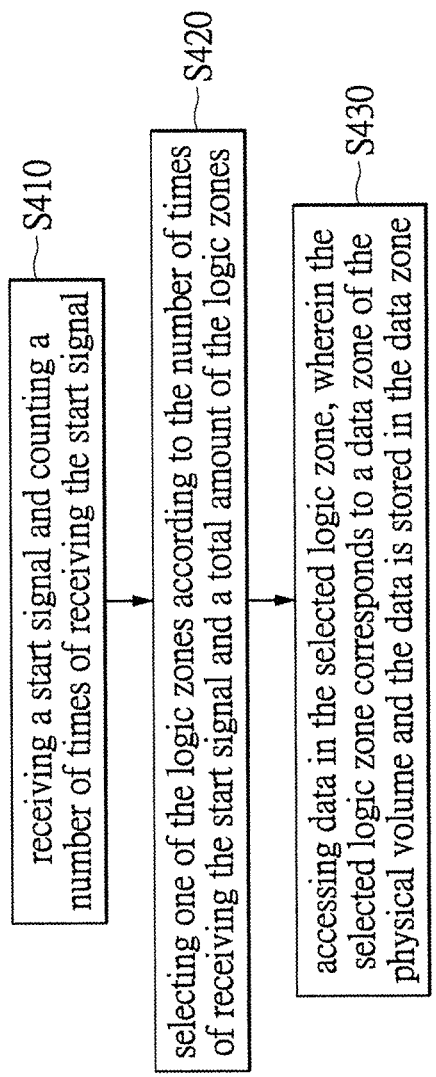
FIG. 4 is a flow diagram of a LBA configuration method according to an exemplary embodiment of the instant disclosure.

From the aforementioned exemplary embodiments, the instant disclosure may generalize a LBA configuration method, which is adapted for the aforementioned non-volatile memory device. For clarity, the following description further elaborates the switch element configured in the non-volatile memory device. Please refer to FIG. 4 in conjunction with FIG. 1 and FIG. 2. Firstly, the controller 120 of the non-volatile memory device 100 receives the start signal St and counts a number of times of receiving the start signal St (Step S410). In the instant disclosure, the start signal St is generated by a booting action of the switch element 10. The generation of the start signal St has been described previously and further description is hereinafter omitted.

Next, the controller 120 of the non-volatile memory device 100 selects one of the logic zones according to the number of times of receiving the start signal St and a total amount of the logic zones of the LBA table 122 (Step S420). In the instant disclosure, each number of times corresponds to one of the logic zones. The method of selecting one of the logic zones is generated by a selection function. The corresponding relationship between the number of times of receiving the start signal St and the logic zones, and the election function has been described previously and further description is hereinafter omitted. Next, the controller 120 of the non-volatile memory device 100 accesses data in the selected logic zone. The selected logic zone corresponds to the data zone of the physical volume 132 and the data is stored in the data zone (Step S430). At present, the controller 120 also transmits the sectors representing the selected logic zone to the LBA table 222 of the processor 220 by the transmission interface 110, to notify the processor 220 executing the data in the corresponding data zone. Then the processor 220 of the electronic device 200 may execute the data stored in the corresponding data zone of the physical volume 132 by the selected logic zone.

Therefore, every time the booting action is executed in the non-volatile memory device 100, the non-volatile memory device 100 determines the logic zones of the LBA table 122 and the corresponding data zone of the physical volume 132 based on the accumulated number of times for booting. Accordingly, in each booting, the electronic device 200 may show data stored in the different data zones of the physical volume and then execute the different data.

In summary, the exemplary embodiments of the instant disclosure provide an LBA configuration method and a non-volatile memory device having the same, which determines one of logic zones configured in an LBA table according to number of times receiving the start signal (i.e., one start signal is generated in each booting). The selected logic zone corresponds to the data zone of the physical volume. The non-volatile memory device accesses data stored in the data zone in the selected logic zone. Accordingly, in each booting, the instant disclosure provide the LBA configuration method and the non-volatile memory device having the same, which can show data stored in the different data zones of the physical volume to simplify user operation and avoid the user maliciously destroying or mistakenly deleting other data stored in the unused data zones of the physical volume, thereby enhancing the efficiency of the non-volatile memory device executing the multi-booting.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. A logic block addressing (LBA) configuration method, adapted for a non-volatile memory device, the non-volatile memory device having a switch element to generate a start signal each time a user presses the switch element, the non-volatile memory device having an LBA table corresponding to a physical volume, the LBA table having a plurality of logic zones, and the LBA configuration method comprising: receiving each start signal and counting a number of times that the start signal is received; selecting one of the logic zones according to the number of times and a total amount of the logic zones; and accessing data in the selected logic zone, wherein the selected logic zone corresponds to a data zone of the physical volume and the data is stored in the data zone; wherein the step of selecting one of the logic zones, further comprises a selection function:

$$vLM=MOD(vPOC/\text{Zone})$$

which is used for selecting one of the logic zones, wherein vLM represents an ordinal of the selected logic zone, vPOC represents the number of times for receiving the start signal, and Zone represents the total amount of the logic zones in the LBA table.

2. The LBA configuration method according to claim 1, wherein the step of selecting one of the logic zones, further comprises:
the number of times corresponding to one of the logic zones.

3. The LBA configuration method according to claim 1, wherein the LBA table comprises the logic zones having the same or different capacity and each of the logic zones is composed of a plurality of sectors.

4. The LBA configuration method according to claim 1, wherein the physical volume has the data zones and the logic zones correspond one-on-one to the data zones.

5. A non-volatile memory device, comprising: a storage memory, configured for storing a physical volume; a transmission interface; a controller, coupled between the storage memory and the transmission interface, the controller configured for having an LBA table corresponding to the physical volume, and the LBA table configured for having a plurality of logic zones; and a switch element, coupled to the controller, that generates a start signal each time a user presses the switch element, wherein the controller receives each start signal and counts a number of times that the start signal is received for selecting one of the logic zones according to the number of times and a total amount of the logic zones, and the controller accesses data in the selected logic zone, wherein the selected logic zone corresponds to a data zone of the physical volume and the data is stored in the data zone; wherein the controller comprises a selection function:

$$vLM=MOD(vPOC/\text{Zone})$$

which is used for selecting one of the logic zones, wherein vLM represents an ordinal of the selected logic zone, vPOC represents the number of times for receiving the start signal, and Zone represents the total amount of the logic zones in the LBA table.

6. The non-volatile memory device according to claim 5, wherein the number of times corresponds to one of the logic zones.

7. The non-volatile memory device according to claim 5, wherein the LBA table comprises the logic zones having the same or different capacity and each of the logic zones is composed of a plurality of sectors.

8. A non-volatile memory device, comprising:
a storage memory configured for storing a physical volume;
a transmission interface;
a controller coupled between the storage memory and the transmission interface, the controller configured for having an LBA table corresponding to the physical volume, and the LBA table configured for having a plurality of logic zones;
wherein the non-volatile memory device is coupled to an electronic device, the electronic device including a switch element generating a start signal and being coupled to the transmission interface, the start signal is generated by the electronic device each time a user presses the switch element and the electronic device transmits the start signal to the controller by the transmission interface;
wherein the controller receives the start signal and counts a number of times for receiving the start signal for selecting one of the logic zones according to the number of times and a total amount of the logic zones, and the controller accesses data in the selected logic zone, wherein the selected logic zone corresponds to a data zone of the physical volume and the data is stored in the data zone;
wherein the controller comprises a selection function:

$$vLM=MOD(vPOC/\text{Zone})$$

which is used for selecting one of the logic zones, wherein vLM represents an ordinal of the selected logic zone, vPOC represents the number of times for receiving the start signal, and Zone represents the total amount of the logic zones in the LBA table.

9. The non-volatile memory device according to claim 5, wherein the controller transmits a plurality of sectors representing the selected logic zone to an electronic device by the transmission interface for providing the electronic device executing the data by the selected logic zone.

* * * * *